Figure 1:
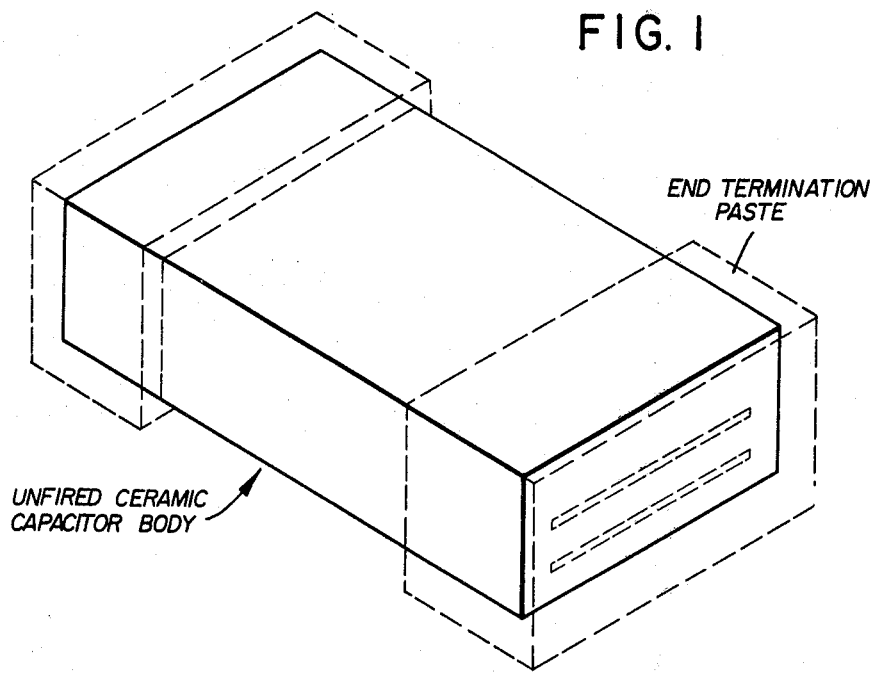

United States Patent [19]

Prakash

[11] 4,353,153

[45] * Oct. 12, 1982

[54] METHOD OF MAKING CAPACITOR WITH CO-FIRED END TERMINATIONS

[75] Inventor: Sri Prakash, Simpsonville, S.C.

[73] Assignee: Union Carbide Corporation, Danbury, Conn.

[*] Notice: The portion of the term of this patent subsequent to Jan. 20, 1998, has been disclaimed.

[21] Appl. No.: 182,501

[22] Filed: Aug. 29, 1980

Related U.S. Application Data

[62] Division of Ser. No. 961,469, Nov. 16, 1978, Pat. No. 4,246,625.

[51] Int. Cl.$^3$ .............................................. H01G 13/00
[52] U.S. Cl. .................................... 29/25.42; 361/309
[58] Field of Search ............... 361/320, 321, 305, 309; 252/513; 106/1.13, 1.18; 29/25.42

[56] References Cited

U.S. PATENT DOCUMENTS

| | | |
|---|---|---|
| 3,028,656 | 4/1962 | Herbert . |
| 3,534,238 | 10/1970 | Buehler . |
| 3,612,963 | 10/1971 | Piper et al. . |
| 3,624,007 | 11/1971 | Meyer .................................... 252/513 |
| 3,694,710 | 9/1972 | Kirschner ........................... 361/321 |
| 3,757,177 | 9/1973 | Buehler . |
| 3,760,244 | 9/1973 | McClelland, Jr. . |
| 3,794,518 | 2/1974 | Howell ........................... 252/513 X |
| 3,809,973 | 5/1974 | Hurley . |
| 3,815,187 | 6/1974 | Hanold . |
| 3,872,360 | 3/1975 | Sheard ................................. 361/305 |
| 3,902,102 | 8/1975 | Burn . |
| 4,001,146 | 1/1977 | Horowitz ....................... 106/1.13 X |
| 4,055,850 | 10/1977 | Prakash ........................... 361/321 X |
| 4,070,518 | 1/1978 | Hoffman ........................ 106/1.13 X |
| 4,079,156 | 3/1978 | Youtsey et al. ................. 252/513 X |
| 4,097,911 | 6/1978 | Dorrian ........................... 361/321 X |
| 4,122,232 | 10/1978 | Kuo ................................. 252/513 X |
| 4,223,369 | 9/1980 | Burn .................................... 361/321 |

FOREIGN PATENT DOCUMENTS 1333698  10/1973  United Kingdom .

OTHER PUBLICATIONS

Jack E. Floegel, "Multilayer Fabrication of Base Metal Ceramic Capacitors,", USCC/Centralab, Presented at the Joint Fall Meeting American Ceramic Society, Indianapolis, Indiana, Sep. 23, 1975.

*Primary Examiner*—Elliot A. Goldberg
*Attorney, Agent, or Firm*—Frederick J. McCarthy, Jr.

[57] ABSTRACT

Ceramic body containing embedded metal electrodes is provided with end termination configurations using a paste containing base metal particles, glass frit and MnO$_2$; the body and end terminations are co-fired to provide a ceramic capacitor.

1 Claim, 3 Drawing Figures

METHOD OF MAKING CAPACITOR WITH CO-FIRED END TERMINATIONS

This application is a division of Ser. No. 961,469 filed Nov. 16, 1978 now Pat. No. 4,246,625 issued Jan. 30, 1981.

The present invention relates to ceramic capacitors. More particularly, the present invention relates to monolithic multi-electrode ceramic capacitors having base metal end terminations.

Monolithic ceramic capacitors are known to the art, for example, see U.S. Pat. Nos. 3,612,963 (1971), 3,815,187 (1974), 4,055,850 (1977) and 3,902,102 (1975) and comprise a ceramic body, e.g., of barium titanate, a plurality of metal film electrodes embedded in the ceramic body and end terminations of silver or a base metal contacting exposed end portions of alternate electrodes and adhering to end portions of the ceramic body.

While noble metals such as silver and silver alloys are conventionally used as electrode materials, it has been proposed to use less expensive nickel and copper as electrode materials in conjunction with nickel and/or copper base metal end terminations. A particular technique of this type is disclosed in U.S. Pat. No. 3,902,102 (1975) whereby the base metal terminations are provided on a pre-fired (about 1300°-1400° C.) ceramic body by applying and subsequently firing at a lower temperature a nickel or copper base metal paste which contains barium borate glass frit. This practice, while providing advantages, does not permit the more economical practice of co-firing the ceramic body and base metal paste since the higher temperatures required in co-firing (at least as high as the ceramic firing temperature of 1300°-1400° C.) lead to oxidation reaction of the base metal and glass constituents of the termination and detrimentally affect the properties of the capacitor, resulting in lower capacitance, higher dissipation factor, lower insulation resistance, and lower adhesion characteristics.

It is therefore, an object of the present invention to provide a ceramic capacitor having base metal end terminations which can effectively be co-fired with the ceramic body of the capacitor.

Figure 2:
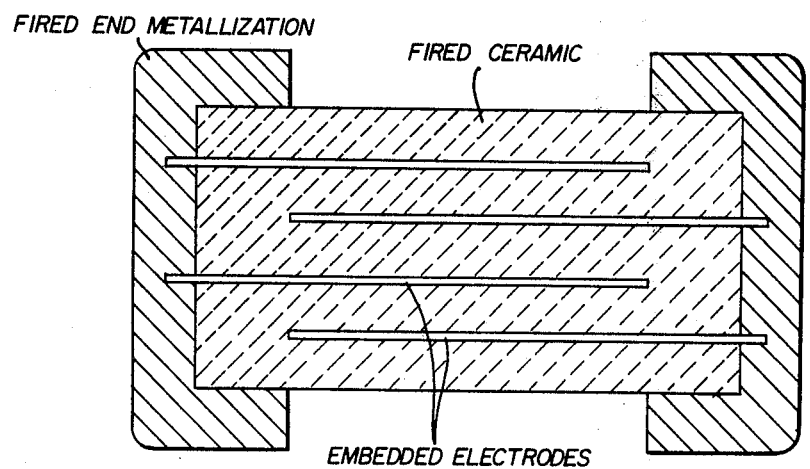
Figure 3:
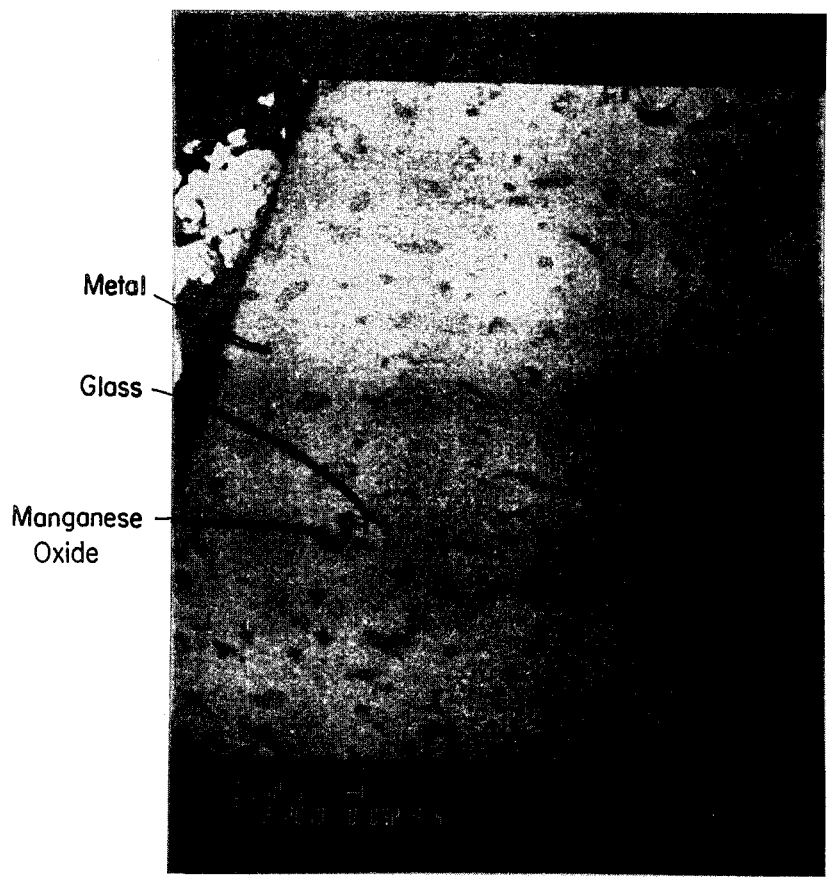

Other objects will be apparent from the following description and claims taken in conjunction with the drawing wherein FIG. 1 illustrates an unfired ceramic capacitor body FIG. 2 shows the body of FIG. 1 after co-firing with base metal end terminations on a fired ceramic body, and FIG. 3 is a scanning electron microscope microphotograph (500×) of a portion of an end termination in accordance with the present invention.

A particular embodiment of the present invention is a base metal paste or ink consisting essentially of an organic vehicle containing a mixture of finely-divided metal powders, nickel or copper, a barium borosilicate or barium aluminosilicate glass frit, and $MnO_2$. The metal powder is suitably sized from about 0.5 to 10 microns and is about 80 to 95% by weight of the inorganic constituents of the paste, e.g., metal, glass, $MnO_2$. The glass frit, suitable sized 0.5μ to 2μ, is about 3 to 14% by weight of the inorganic constituents of the paste and the $MnO_2$ additive suitably sized 0.5μ to 20μ, is about 1.5 to 3% by weight of the inorganic constituents of the paste. The organic vehicle is suitably from about 20 to 40% of the weight of the inorganic constituents and is suitably ethyl cellulose dissolved in butyl cellusolve or other resin fromulations used in pastes and known to the art.

In the practice of the present invention, thin slips of a green, dried, ceramic, unfired conventional formulation, e.g., barium titanate containing up to about 90% of modifiers such as $CaZrO_3$, $BaCO_3$ and $MnO_2$, and the like are screen printed with an ink containing metal particles, e.g., nickel particles to provide electrode patterns. The dried, unfired slips are stacked and the end portions thereof are coated with a paste in accordance with the present invention. The stack is subsequently fired, e.g., at 1300°-1400° C. preferably for 4 to 6 hours in the course of which both the green ceramic, electrodes and the end termination paste are fired to provide a monolithic, multielectrode ceramic capacitor. The capacitor has excellent properties, e.g., higher capacitance value, low d.f. (dissipation factor) and high IR (insulation resistance), and the base metal end terminations are sound and strongly adherent, e.g., >5 lbs. measured "pull" strength.

The fired end termination comprises a spongelike network of sintered base metal particles with particles of manganese oxide and glass filling the network with manganese oxide intermediate to the glass and metal as illustrated in FIG. 3.

In the practice of the present invention, the dielectric ceramic materials employed are well known reduction resistant materials such as $BaTiO_3$, $CaZrO_3$, $BaCO_3$ and $MnO_2$ and the like.

The glass employed in the present invention is a barium borosilicate or barium aluminosilicate type such as:

BaO 40-55%, $B_2O_3$ 20% and $SiO_2$ 35% to 60%
BaO 40-55%, $Al_2O_3$ 5% and $SiO_2$ 40-55%

The following examples will further illustrate the present invention:

EXAMPLE I

An end termination paste was prepared by mixing in a resin the inorganic constituents in proportions as follows: 91% by weight nickel powder sized 1-5μ, 6% by weight of glass frit sized 0.5μ to 2.0μ (barium-aluminum silicate) with 3% by weight of $MnO_2$ sized 1-5μ, and the organic vehicle was ethyl cellulose (8% by weight) dissolved in butyl cellusolve and contained 2% by weight of surfactant (Raybo* 56)*. The vehicle was 31% of the weight of the inorganic constituents. The resulting paste was three-roll milled to achieve optimum disperson of the metal powder.

*Trademark of Raybo Chemical.

EXAMPLE II

Finely divided powder containing about 85-90% barium titanate balance, calcium zirconate, barium carbonate and manganese dioxide, was mixed with about 8% by weight pasticized polyvinyl alcohol and slip cast and dried to provide green ceramic tape about 2 mils thick.

Rectangular electrode patterns (0.223 in.×0.224 in.×0.003 in.) were screen printed using an ink containing nickel particles on the green ceramic tape using a 325 mesh (U.S. Series) stainless steel screen. The printed green ceramic tape was cut into strips and stacked in a capacitor configuration as shown in FIG. 1. The capacitor configuration was arranged to have 18 printed electrodes, i.e., 17 active dielectric layers. A paste of the composition of Example I was applied as end terminations to the unfired ceramic body, and the body was subsequently fired in an argon gas atmosphere at 1350° C. for about 5 hours. Leads were attached by solder dipping and measured properties of twenty capacitors were as follows:

Cap.—170 nF–250 nF
D.F.—0.38 to 1.1%
Room IR (50 V)—10--15G
Hot IR-85° C.—2-3G

EXAMPLE III

The procedure of Example II was followed except that the paste used for the end terminations did not contain $MnO_2$. The measured properties of twenty capacitors were as follows:

Cap.—100-150 nF
D.F.—1.0-3.0%
Room IR—1-5G
Hot IR-85° C.—240K-500M

As can be seen by comparing the results of Examples II and III, the capacitors of Example II, in which $MnO_2$ was used in the end termination paste, in accordance with the present invention, have improved properties. This is believed to be due to the presence of manganese intermediately adjacent to glass particle in the metal phase of the end termination which inhibits oxidation of the metal phase in the firing step of forming capacitors.

What is claimed is:

1. In a method of making a multielectrode ceramic capacitor by providing a green ceramic body containing a plurality of embedded electrodes, coating end portions of the green ceramic body with a paste containing finely divided metal particles and co-firing the green ceramic body and paste coating, the improvement which comprises employing as said paste a paste consisting essentially of a mixture, in an inorganic vehicle, of a finely divided metal selected from nickel and copper; glass frit, said glass being selected from barium borosilicate glass and barium aluminosilicate glass; and $MnO_2$; the properties by weight of the said metal, glass frit and $MnO_2$ being from about 80 to 95% metal
3 to 14% glass frit
1.5 to 3% $MnO_2$.

* * * * *